(12) United States Patent
Waidman et al.

(10) Patent No.: US 10,582,086 B2
(45) Date of Patent: Mar. 3, 2020

(54) DYNAMIC DOT GAIN LOOKUP TABLE GENERATION

(71) Applicant: HP INDIGO B.V., Amstelveen (NL)

(72) Inventors: Ran Waidman, Rehovot (IL); Tal Frank, Ness Ziona (IL); Nir Guttman, Ness Ziona (IL)

(73) Assignee: HP Indigo B.V., Amstelveen (NL)

( * ) Notice: Subject to any disclaimer, the term of this patent is extended or adjusted under 35 U.S.C. 154(b) by 0 days.

(21) Appl. No.: 16/073,000

(22) PCT Filed: Apr. 21, 2016

(86) PCT No.: PCT/EP2016/058945
§ 371 (c)(1),
(2) Date: Jul. 26, 2018

(87) PCT Pub. No.: WO2017/182090
PCT Pub. Date: Oct. 26, 2017

(65) Prior Publication Data
US 2019/0037103 A1    Jan. 31, 2019

(51) Int. Cl.
| | | |
|---|---|---|
| H04N 1/401 | (2006.01) | |
| H04N 1/405 | (2006.01) | |
| H04N 1/52 | (2006.01) | |
| H04N 1/54 | (2006.01) | |
| H04N 1/58 | (2006.01) | |
| H04N 1/407 | (2006.01) | |

(52) U.S. Cl.
CPC ........... *H04N 1/4051* (2013.01); *H04N 1/405* (2013.01); *H04N 1/407* (2013.01); *H04N 1/52* (2013.01); *H04N 1/54* (2013.01); *H04N 1/58* (2013.01)

(58) Field of Classification Search
USPC .............. 358/1.1–3.29, 1.11–1.18, 504, 406; 359/58–67
See application file for complete search history.

(56) References Cited

U.S. PATENT DOCUMENTS

| | | |
|---|---|---|
| 6,671,070 B1 | 12/2003 | Schildermans et al. |
| 6,798,536 B1 | 9/2004 | Muramoto |
| (Continued) | | |

FOREIGN PATENT DOCUMENTS

| | | |
|---|---|---|
| EP | 1365576 | 11/2003 |
| JP | 2007295250 | 11/2007 |
| WO | WO-0072580 | 11/2000 |

OTHER PUBLICATIONS

Namedanian, Mahziar, et al. "Physical and optical dot gain: characterization and relation to dot shape and paper properties." Color Imaging Xix: Displaying, Processing, Hardcopy, and Applications. vol. 9015. International Society for Optics and Photonics, 2014.

*Primary Examiner* — Marcellus J Augustin
(74) *Attorney, Agent, or Firm* — HP Inc. Patent Department (57) ABSTRACT

Measures for use in calibrating a printing device. Historical dot gain linearization lookup table data for the printing device is processed. On the basis of the processed historical dot gain linearization lookup table data, a plurality of input points for a current dot gain linearization lookup table are dynamically determined. The printing device is calibrated according to the dynamically determined current dot gain linearization lookup table.

20 Claims, 9 Drawing Sheets

(56) References Cited

U.S. PATENT DOCUMENTS

| | | | | |
|---|---|---|---|---|
| 6,803,933 B1* | 10/2004 | Staelin | .................. | H04N 1/603 182/155 |
| 6,863,360 B2 | 3/2005 | Sanger | | |
| 7,050,200 B2 | 5/2006 | Sanger | | |
| 2010/0067059 A1* | 3/2010 | Sivan | .................. | H04N 1/4055 358/3.06 |

* cited by examiner

DYNAMIC DOT GAIN LOOKUP TABLE GENERATION

BACKGROUND

Dot gain linearization lookup tables are used in printing systems to compensate for dot gain produced during printing. When building a dot gain linearization lookup table for different scenarios, for example different substrates, inks, screens, time and printing devices, a variety of different graphs depicting input to output for dot gain linearization lookup tables can be produced.

In some cases when the dot gain is high, a very high output dot area may be produced for a low input dot area, for example a 90% output on a 40% input. In other cases, a lower output dot area may be produced for a higher input dot area, for example a 60% output on a 40% input. This phenomena is a manifestation of many aspects of the printing process, which can be related to a specific printing device. Therefore, predicting the form of dot gain linearization graphs for specific combinations of substrates, inks, screens, times and printing devices is challenging.

BRIEF DESCRIPTION OF THE DRAWINGS

Various features of the present disclosure will be apparent from the detailed description which follows, taken in conjunction with the accompanying drawings, which together illustrate certain example features, and wherein.

DETAILED DESCRIPTION

In the following description, for purposes of explanation, numerous specific details of certain examples are set forth. Reference in the specification to "an example" or similar language means that a particular feature, structure, or characteristic described in connection with the example is included in at least that one example, but not necessarily in other examples.

When building dot gain linearization lookup tables, some printing devices will use the same static points, regardless of the different current conditions such as substrate, ink, screen, time and printing device. This means that the sampled points may not be particularly well suited to the printing conditions and may miss some important features of the dot gain linearization lookup table. This sub-optimum sampling can cause inaccuracy of color and vignette jumps. The term 'screen' here refers to the pattern of spots used in halftoning techniques. The term 'vignette' here refers to different tones for an ink. The term 'vignette jump' here refers to an abrupt change or transition in the tone of an ink (compared to a smooth change transition of ink tone).

According to examples of the present disclosure, if the dot gain is relatively high it can be desirable to sample more digital points in highlight areas when generating a dot gain linearization lookup table. According to examples, if the dot gain is relatively low, it can be desirable to sample more digital points in shadow and mid-tone areas when generating a dot gain linearization lookup table.

Examples described herein introduce new measures for use in dot gain linearization lookup table sampling. Some examples involve making use of historical dot gain linearization lookup table data when determining which input points to use for dot gain linearization lookup table generation. By analyzing the dot gain linearization lookup table history, digital input points for dot gain linearization lookup tables can be determined to spread the output points more evenly along the output scale.

Examples therefore select input points for dot gain linearization lookup tables such that the dot gain linearization lookup tables are more robust and better fitted to the dot gains of specific printing conditions such as specific screens, substrates, inks, times and printing devices.

Figure 1:
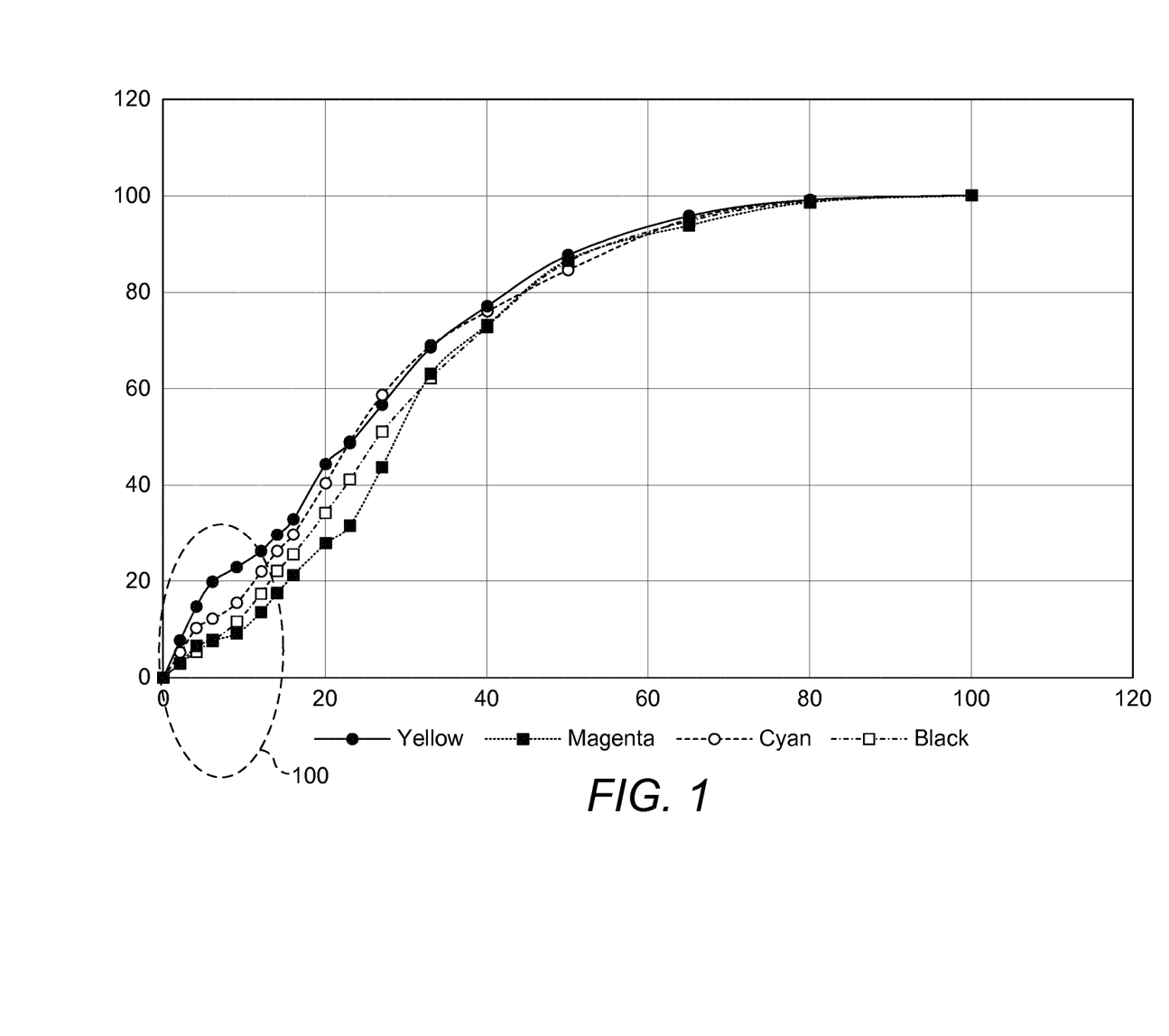
FIG. 1 shows a graph of dot gain linearization lookup tables for a printing device according to examples.

FIG. 1 shows a graph of dot gain linearization lookup tables for a printing device where the same 17 static input points are used for each of four inks (yellow, magenta, cyan, black) on the same screen.

From FIG. 1, it can be seen that each of the inks has a different graph. In the example graphs, the yellow ink can be seen to have a large dot gain growth in light area 100.

Figure 2:
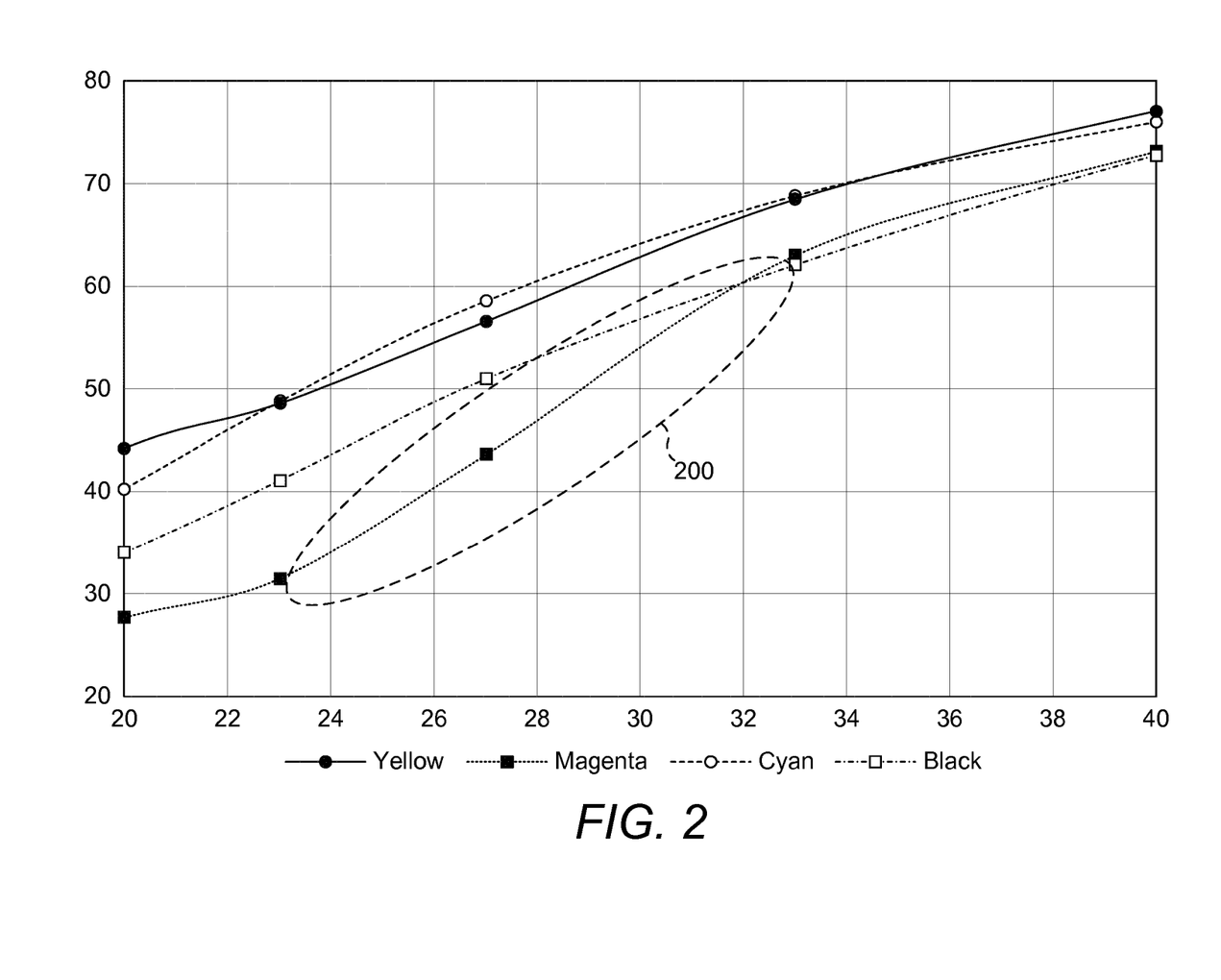
FIG. 2 shows a graph of a portion of dot gain linearization lookup tables for the same printing device as plotted in FIG. 1 according to examples.

FIG. 2 shows a graph of a portion of dot gain linearization lookup tables for the same printing device as plotted in FIG. 1, where again, the same 17 static input points are used for each of the four inks on the same screen. In particular, FIG. 2 shows a zoomed-in version of the graph of FIG. 1 for the input points ranging between 20 and 40.

From FIG. 2, it can be seen that the magenta ink, in the particular example shown, has a larger dot gain growth in mid-tone area 200 compared to the other inks.

The static sample points that are used in this printer are very tight in the highlight area, such that the yellow ink is sampled well where it is mostly needed. However, the mid-tones are not sampled very tightly such that printing of the magenta ink suffers from an inaccuracy of dot area in these areas.

A manifestation of this inaccuracy is that vignette jumps are created for the magenta ink of the printing device.

Figure 3:
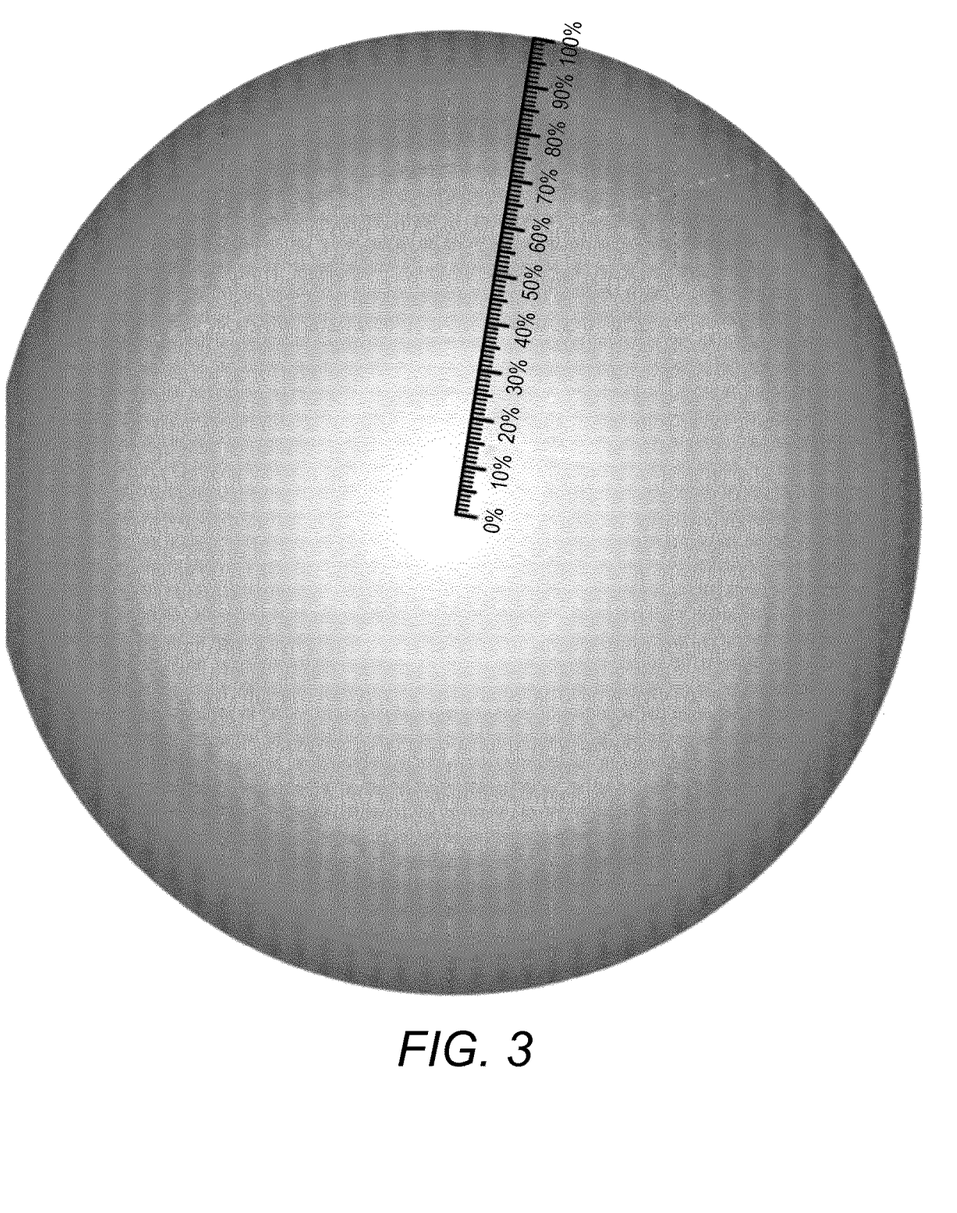
FIG. 3 shows a plot of vignette tones for magenta ink for a printing device without use of examples described herein.

FIG. 3 shows a plot of vignette tones for magenta ink for a printing device without use of examples described herein.

From FIG. 3, it can be seen that the magenta ink has several vignette jumps where sudden changes (in a radial direction) in the colour for the magenta ink can be observed in mid-tone areas.

Examples described herein tackle the vignette jump phenomena observed in FIG. 3 by employing dynamic generation of dot gain linearization lookup tables.

Figure 4:
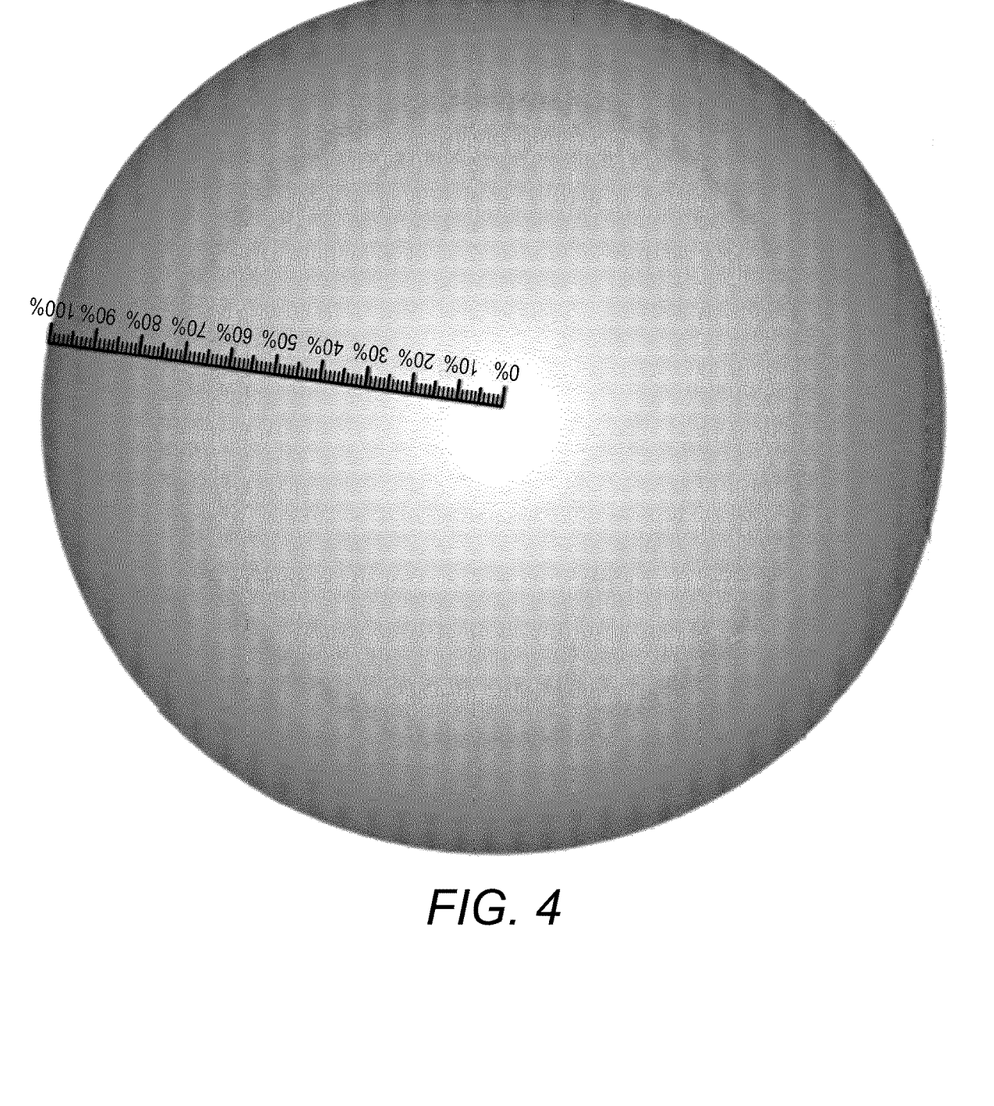
FIG. 4 shows a plot of vignette tones for magenta ink for the same printing device as plotted in FIG. 3, but after examples described herein have been applied.

FIG. 4 shows a plot of vignette tones for magenta ink for the same printing device as plotted in FIG. 3, but after examples described herein have been applied.

The examples depicted in FIG. 4, have sample points spread more tightly in mid-tone areas and less tightly in high light areas. This leads to a reduction in the vignette jump phenomena from FIG. 3; in FIG. 4 the colours can be seen to change more smoothly than in FIG. 3 without sudden jumps. By use of dynamically generated dot gain linearization lookup tables, examples described herein avoid vignette jumps and instead provide smoothly transitioning vignettes.

Figure 5:
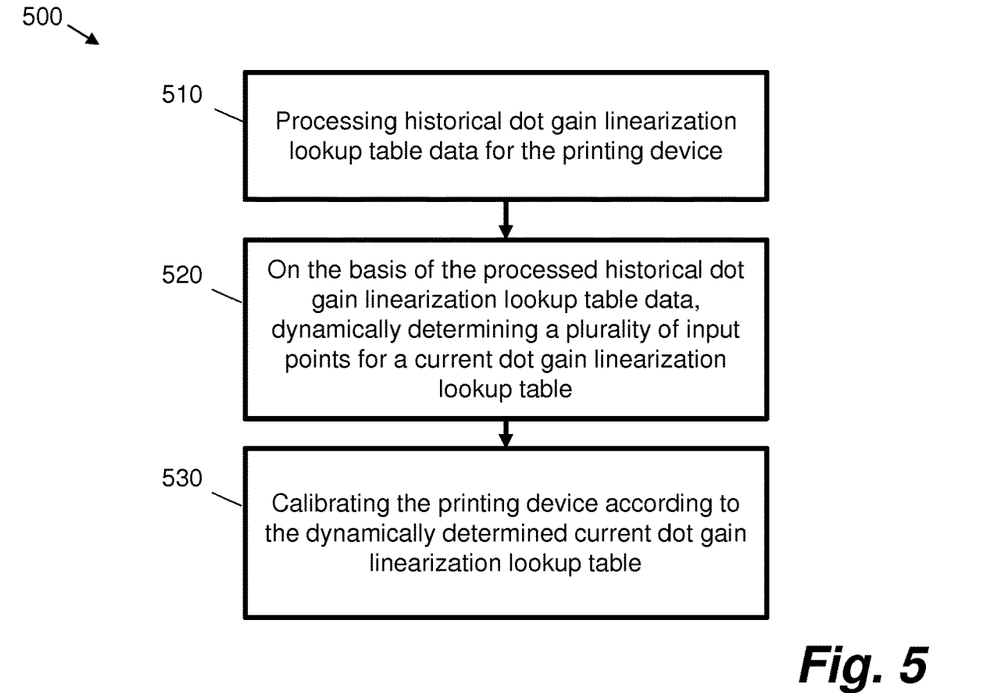
FIG. 5 is a flowchart showing a method for use in calibrating a printing device according to examples.

FIG. 5 is a flowchart showing a method 500 for use in calibrating a printing device according to examples.

At block 510, historical dot gain linearization lookup table data for the printing device is processed. The processing may for example involve applying a weighting factor to give different weights to data depending on timestamps associated with the data.

At block 520, on the basis of the processed historical dot gain linearization lookup table data, a plurality of input points for a current dot gain linearization lookup table are dynamically determined.

At block 530, the printing device is calibrated according to the dynamically determined current dot gain linearization lookup table.

According to certain examples, the dynamic determining comprises selecting the plurality of input points so as to increase the uniformity of spacing between a plurality of output points corresponding to the plurality of input points in the current dot gain linearization lookup table.

Certain examples comprise selecting a uniform output point spacing for the current dot gain linearization lookup table and on the basis of the selecting, identifying a plurality of uniformly spaced output points for the current dot gain linearization lookup table. In such examples, the dynamic determining comprises selecting the plurality of input points on the basis of the identified plurality of uniformly spaced output points.

In certain examples, the historical dot gain linearization lookup table data comprises a plurality of dot gain linearization lookup tables for the printing device. In some such examples, the plurality of dot gain linearization lookup tables comprises at least a more recent dot gain linearization lookup table and a less recent dot gain linearization lookup table.

Certain examples comprise calculating a weighted average of data from the plurality of dot gain linearization lookup tables. In such examples, the dynamically determining is carried out on the basis of the calculated weighted average.

In certain examples, the weighted average is calculated such that data from a more recent dot gain linearization lookup table in the plurality of dot gain linearization lookup tables is given a different weighting than data from a less recent dot gain linearization lookup table in the plurality of dot gain linearization lookup tables.

Certain examples comprise applying a sliding window to data from the plurality of dot gain linearization lookup tables for the printing device. In such examples, the dynamically determining is carried out on the basis of data resulting from the application of the sliding window.

In certain examples, the sliding window has a configurable weighting factor. The weighting factor can for example be configured to give more weight to more recent data compared to less recent data or vice versa. Giving more weight to more recent data assists in emphasizing the effect of more current conditions whilst still giving some consideration to older data. Giving more weight to older data can assist in providing stability in view of variations in current conditions.

According to examples, historical dot gain linearization lookup table data can be calculated by using the following relations:

For each digital point:

$$outHistory = OldHistory[digital]$$

$$outLUT = newLUT[digital]$$

$$newHistory = w*outLUT + (1-w)*outHistory$$

Here, 'w' is a sliding window weighting factor which can be configured to have a value between zero and one.

In certain examples, the historical dot gain linearization lookup table data can be processed as follows in order to select the digital input points:

$$Distance = 100/(numberOfLUTPoints-1)$$

For i=0 to i=numberOfLUTPoints-1

$$Digital[i] = (Inverse(HistoricLUT))[distance*i]$$

Here, the 'Inverse' operation denotes going from output to input on the historical dot gain linearization lookup table data.

Certain examples comprise on the basis of the processed historical dot gain linearization lookup table data, further dynamically determining a further plurality of input points for a further current dot gain linearization lookup table; in such examples, the further plurality of input points for the further current dot gain linearization lookup table comprise one or more input points which are different from the plurality of input points for the current dot gain linearization lookup table. Such examples then comprise calibrating the printing device according to the dynamically determined further current dot gain linearization lookup table. Subsequent calibrations of a printing device can therefore be performed to keep the calibration up-to-date according to examples.

In certain examples, one or more of the dynamically determined current dot gain linearization lookup table and the further dynamically determined current dot gain linearization lookup table comprise data specific to one or more of a print screen, a substrate, an ink, a printing time, and a printing device type.

In certain examples, the historical dot gain linearization lookup table data comprises a plurality of dot gain linearization lookup tables for the printing device. Such examples comprise merging input points which are common to two or more dot gain linearization lookup tables from the plurality of dot gain linearization lookup tables such that no input points are repeated in the dynamical determining of the plurality of input points for the current dot gain linearization lookup table.

According to certain examples, historical dot gain linearization lookup table data can be calculated by merging inputs from one or more older 'historic' dot gain linearization lookup tables and a new (or 'current') dot gain linearization lookup table, such that there is no repetition of the same inputs. So for example if one dot gain linearization lookup table had 10 input points and another dot gain linearization lookup table had 15 input points with 3 points in common, then a merged set of input would have 11 input points according to some examples.

Figure 6:
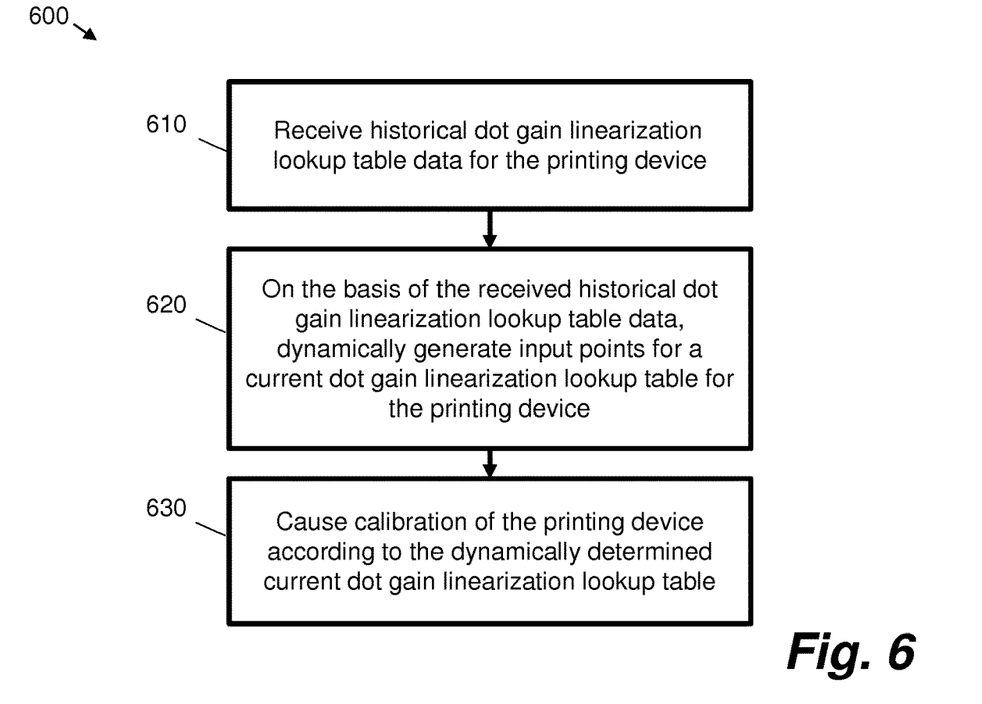
FIG. 6 is a schematic diagram showing operation of a system according to examples.

FIG. 6 is a flow chart showing operation 600 of a system for use in calibrating a printing device according to examples. The system comprises a controller.

At block 610, the controller receives historical dot gain linearization lookup table data for the printing device.

At block 620, the controller, on the basis of the received historical dot gain linearization lookup table data, dynamically generates input points for a current dot gain linearization lookup table for the printing device.

At block 630, the controller causes calibration of the printing device according to the dynamically determined current dot gain linearization lookup table.

Figure 7:
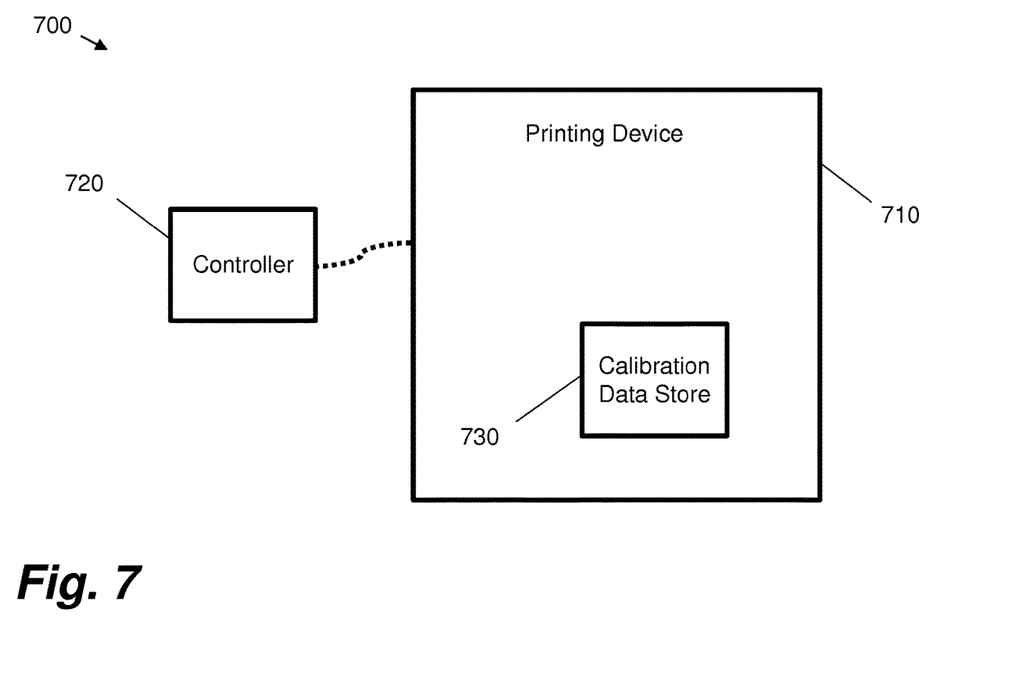
FIG. 7 depicts an arrangement of a system according to examples.

FIG. 7 depicts a possible arrangement 700 of the system for use in calibrating a printing device whose operation was depicted in FIG. 6. In the arrangement of FIG. 7, controller 720 is located separately to printing device 710. Printing device 710 comprises a calibration data store 730 for storing data relating to examples, for example historic dot gain lookup table linearization data. In these examples, the controller is comprised in a separate device to the printing device. Controller 720 may for example comprise or be comprised in a computing device.

Figure 8:
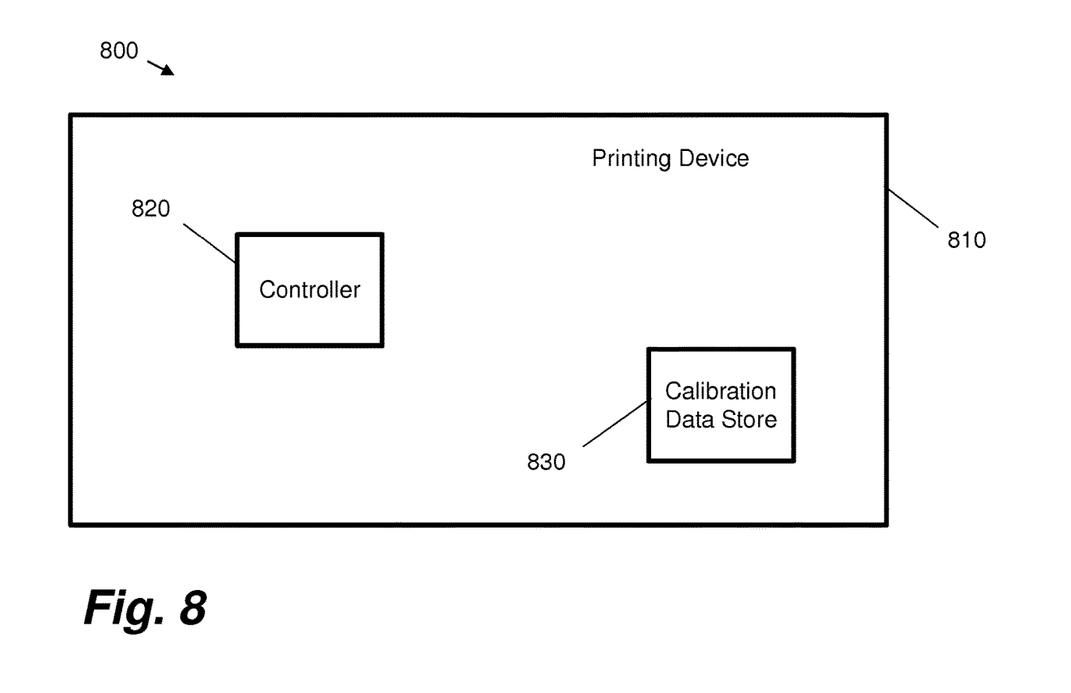
FIG. 8 depicts an arrangement of a system according to examples.

FIG. 8 depicts a possible arrangement 800 of the system for use in calibrating a printing device whose operation was depicted in FIG. 6. In the arrangement of FIG. 8, controller 820 is located integrally to printing device 810. Printing device 710 comprises a calibration data store 830 for storing data relating to examples. In these examples, the controller is comprised in the same device as the printing device. Controller 820 may for example comprise a processing module within printing device 810.

Figure 9:
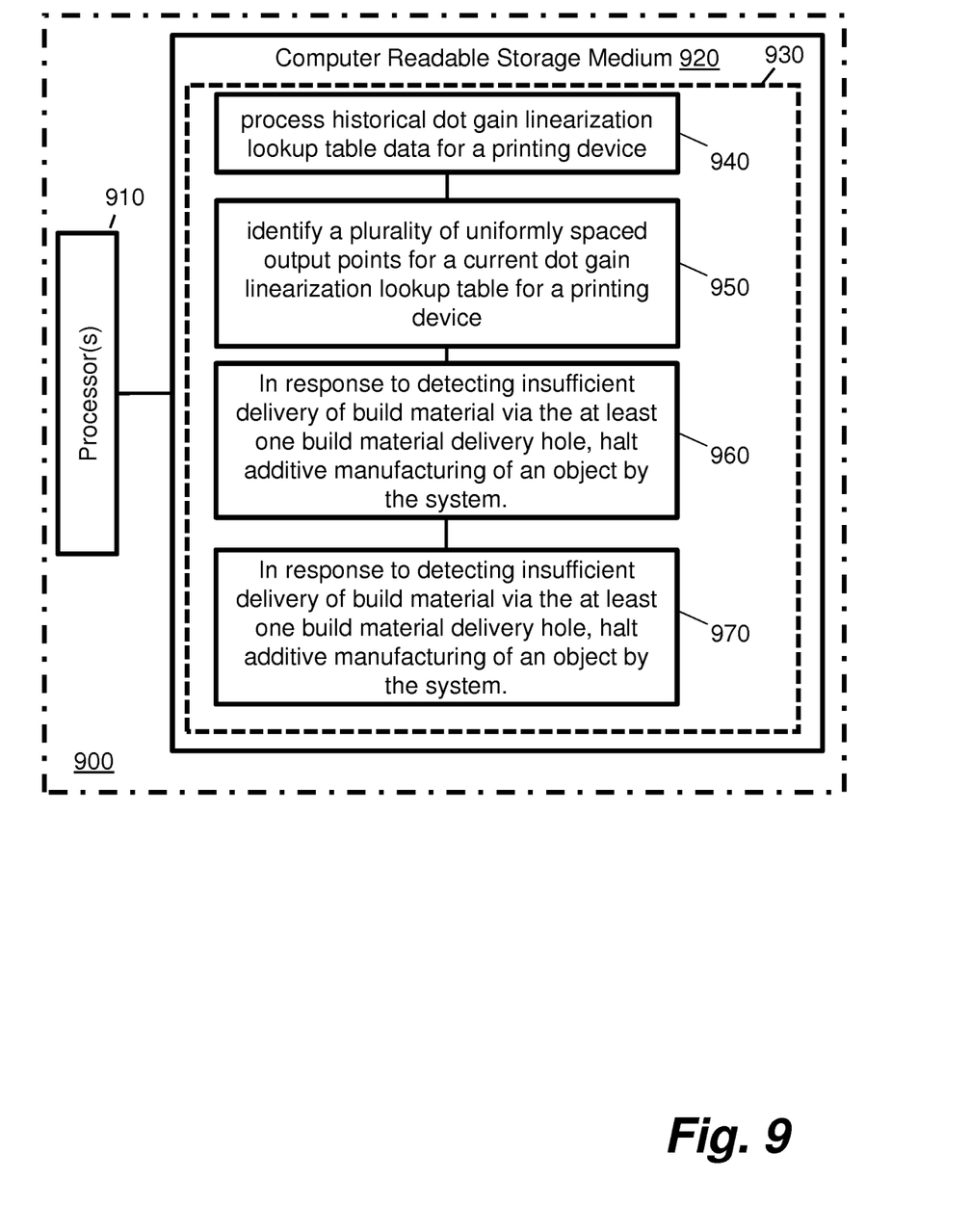
FIG. 9 is a schematic illustration of a processing device according to an examples.

Certain system components and methods described herein may be implemented by way of machine readable instructions that are storable on a non-transitory storage medium. FIG. 9 shows an example of a processing device 900 comprising at least one processor 910 arranged to retrieve data from a computer-readable storage medium 920. The computer-readable storage medium 920 comprises a set of computer-readable instructions 930 stored thereon. The at least one processor 910 is configured to load the instructions 930 into memory for processing. The instructions 930 are arranged to cause the at least one processor 910 to perform a series of actions.

Instruction 940 is configured to cause the processor 910 to process historical dot gain linearization lookup table data for a printing device.

Instruction 950 is configured to cause the processor 910 to identify a plurality of uniformly spaced output points for a current dot gain linearization lookup table for a printing device.

Instruction 960 is configured to cause the processor 910 to, on the basis of the identified plurality of uniformly spaced output points, dynamically determine a plurality of input points for the current dot gain linearization lookup table.

Instruction 970 is configured to cause the processor 910 to calibrate the printing device according to the dynamically determined current dot gain linearization lookup table.

The non-transitory storage medium can be any media that can contain, store, or maintain programs and data for use by or in connection with an instruction execution system. Machine-readable media can comprise any one of many physical media such as, for example, electronic, magnetic, optical, electromagnetic, or semiconductor media. More specific examples of suitable machine-readable media include, but are not limited to, a hard drive, a random access memory (RAM), a read-only memory (ROM), an erasable programmable read-only memory, or a portable disc.

In order to demonstrate the improvements provided by examples, some example outcomes are described below.

Figure 10:
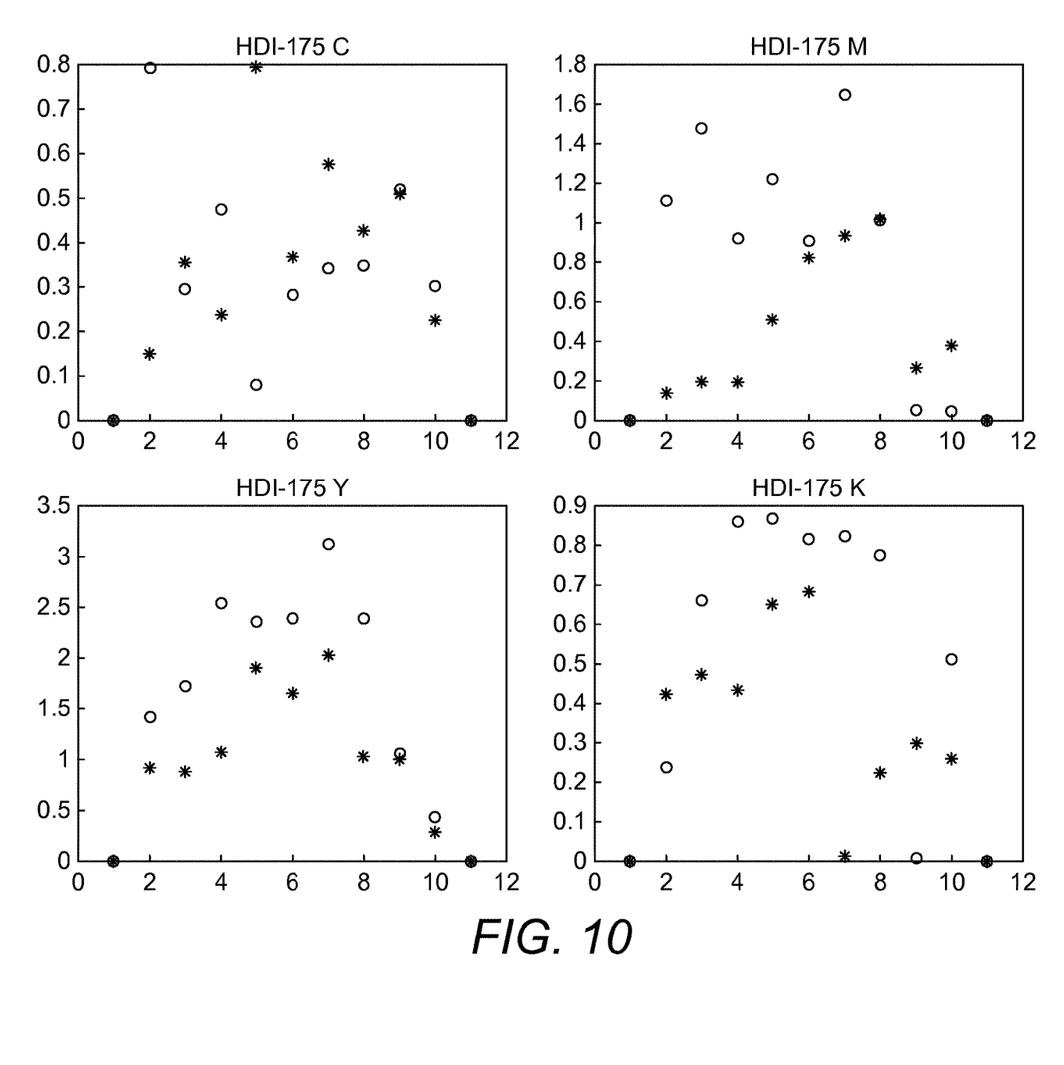
FIG. 10 shows example plots depicting the difference from target dot area for experiments for several different inks.

Calibration using 17 static input points and calibration using 27 dynamic input points according to examples was carried out. After each calibration, a measurable print job was performed using different 10 dot areas for each of four inks (yellow (Y), magenta (M), cyan (C), black (K)). The plots of FIG. 10 depict the difference between target dot area of each experiment for each of the inks. The circles show the results for the static input points case and the stars show the results for dynamic input points case. As can be seen from FIG. 10, the dot gain difference is lower in the majority of cases for dynamic calibration according to examples than for the respective static case.

Figure 11:
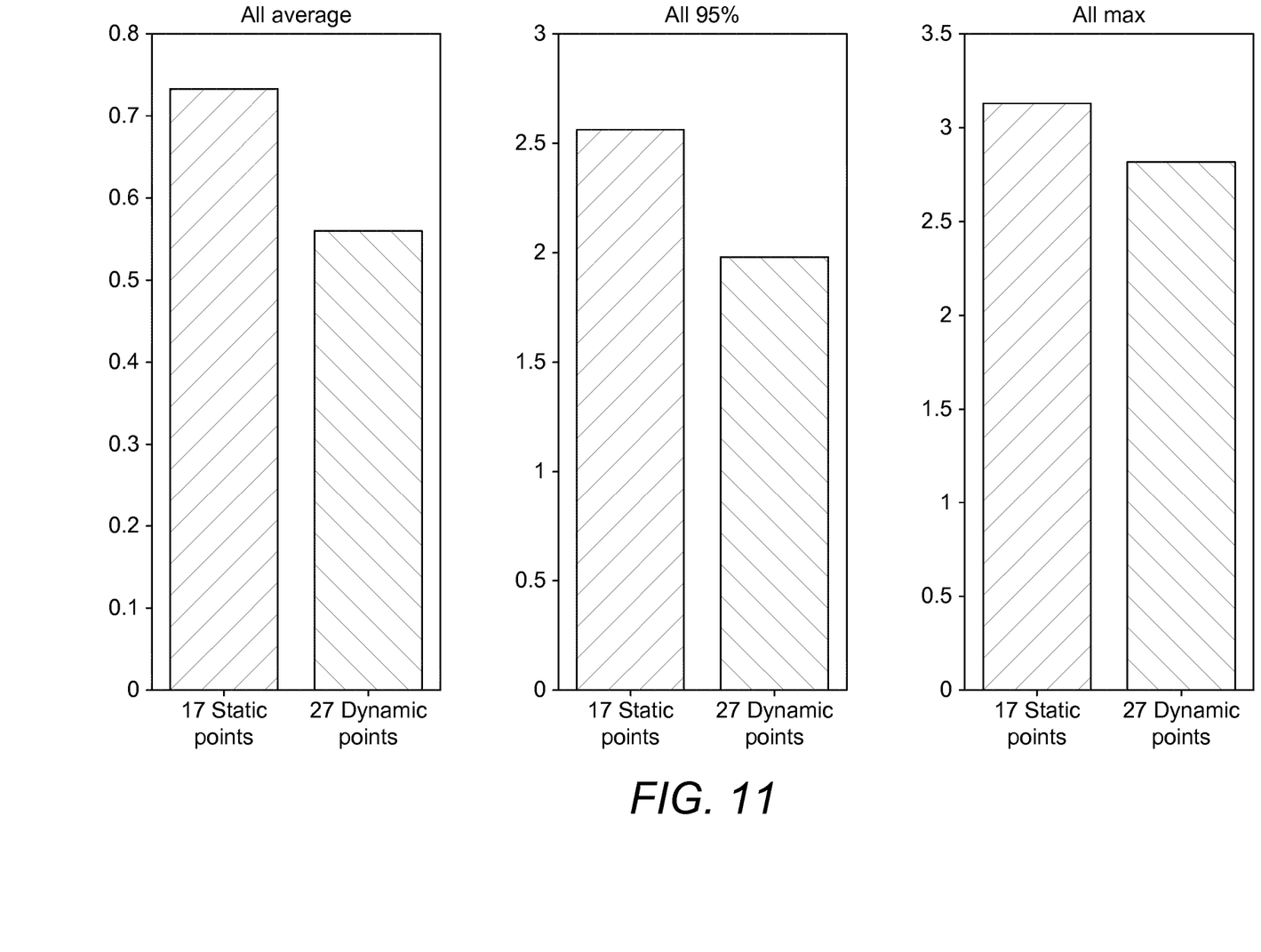
FIG. 11 shows example graphs summarizing the results of the testing depicted in FIG. 10.

FIG. 11 shows some graphs summarizing the results of the example outcomes depicted in FIG. 10. The left graph shows that the overall average improvement is better for the dynamic calibration case than for the static case. The middle hand graph shows that the average improvement for the 95% percentile is better for the dynamic calibration case than for the static case. The right graph shows that the maximum difference from the target dot area is lower for the dynamic calibration case than for the static case.

Vignettes jumps tend to occur in places where dot gain linearization lookup tables have less information, which typically means not enough digital points in certain places. Examples described herein improve this situation by adding sample points in a more symmetric manner, leading to those jumps being reduced dramatically Examples described herein involve spreading the sample points for dot gain linearization lookup tables in a way that better fits the machine dot gain which leads to improvements in color accuracy.

The preceding description has been presented to illustrate and describe examples of the principles described. This description is not intended to be exhaustive or to limit these principles to any precise form disclosed. Many modifications and variations are possible in light of the above teaching.

The invention claimed is:

1. A method for use in calibrating a printing device, the method comprising:
    processing historical dot gain linearization lookup table data for the printing device;
    on the basis of the processed historical dot gain linearization lookup table data, dynamically determining a plurality of input points for a current dot gain linearization lookup table, wherein the dynamic determining comprises selecting the plurality of input points so as to increase the uniformity of spacing between a plurality of output points corresponding to the plurality of input points in the current dot gain linearization lookup table; and
    calibrating the printing device according to the dynamically determined current dot gain linearization lookup table.

2. The method of claim 1, comprising:
    selecting a uniform output point spacing for the current dot gain linearization lookup table; and
    on the basis of the selecting, identifying a plurality of uniformly spaced output points for the current dot gain linearization lookup table,
    wherein the dynamic determining comprises selecting the plurality of input points on the basis of the identified plurality of uniformly spaced output points.

3. The method of claim 1, wherein the historical dot gain linearization lookup table data comprises a plurality of dot gain linearization lookup tables for the printing device.

4. The method of claim 3, wherein the plurality of dot gain linearization lookup tables comprises at least a more recent dot gain linearization lookup table and a less recent dot gain linearization lookup table.

5. The method of claim 3, comprising calculating a weighted average of data from the plurality of dot gain linearization lookup tables,
    wherein the dynamically determining is carried out on the basis of the calculated weighted average.

6. The method of claim 5, wherein the weighted average is calculated such that data from a more recent dot gain linearization lookup table in the plurality of dot gain linearization lookup tables is given a different weighting than data from a less recent dot gain linearization lookup table in the plurality of dot gain linearization lookup tables.

7. The method of claim 3, comprising applying a sliding window to data from the plurality of dot gain linearization lookup tables for the printing device,
    wherein the dynamically determining is carried out on the basis of data resulting from the application of the sliding window.

8. The method of claim 7, wherein the sliding window has a configurable weighting factor.

9. The method of claim 1, comprising:
    on the basis of the processed historical dot gain linearization lookup table data, further dynamically determining a further plurality of input points for a further current dot gain linearization lookup table, wherein the further plurality of input points for the further current dot gain linearization lookup table comprise one or more input points which are different from the plurality of input points for the current dot gain linearization lookup table; and
    calibrating the printing device according to the dynamically determined further current dot gain linearization lookup table.

10. The method of claim 1, wherein one or more of the dynamically determined current dot gain linearization lookup table and the further dynamically determined current dot gain linearization lookup table comprise data specific to one or more of:
    a print screen,
    a substrate,
    an ink,
    a printing time, and
    a printing device type.

11. The method of claim 1, wherein the historical dot gain linearization lookup table data comprises a plurality of dot gain linearization lookup tables for the printing device, the method comprising:
    merging input points which are common to two or more dot gain linearization lookup tables from the plurality of dot gain linearization lookup tables such that no input points are repeated in the dynamical determining of the plurality of input points for the current dot gain linearization lookup table.

12. The method of claim 1, wherein the dynamically determined current dot gain linearization lookup table contains points found in multiple historical dot gain linearization lookup tables.

13. A system for use in calibrating a printing device, the system comprising a controller programmed to:
    receive historical dot gain linearization lookup table data for the printing device;
    on the basis of the received historical dot gain linearization lookup table data, dynamically generate input points for a current dot gain linearization lookup table for the printing device, and applying a sliding window to data from a plurality of dot gain linearization lookup tables for the printing device, wherein the dynamically generating input points is carried out on the basis of data resulting from the application of the sliding window; and
    cause calibration of the printing device according to the dynamically determined current dot gain linearization lookup table.

14. The system of claim 13, wherein the controller is comprised in a separate device to the printing device.

15. A non-transitory computer-readable storage medium storing instructions that, if executed by a processor, cause the processor to:
    process historical dot gain linearization lookup table data for a printing device;
    identify a plurality of uniformly spaced output points for a current dot gain linearization lookup table for a printing device;
    on the basis of the identified plurality of uniformly spaced output points, dynamically determine a plurality of input points for the current dot gain linearization lookup table; and
    calibrate the printing device according to the dynamically determined current dot gain linearization lookup table.

16. The medium of claim 15, wherein the processor is comprised in a separate device to the printing device.

17. The medium of claim 15, wherein the instructions further comprise: applying a sliding window to data from the plurality of dot grain linearization lookup tables for the printing device, wherein the dynamically determining is carried out on the basis of data resulting from the application of the sliding window.

18. The medium of claim 15, wherein the instructions further comprise: selecting a uniform output point spacing for the current dot gain linearization lookup table; and
    on the basis of the selecting, identifying a plurality of uniformly spaced output points for the current dot gain linearization lookup table,
    wherein the dynamic determining comprises selecting the plurality of input points on the basis of the identified plurality of uniformly spaced output points.

19. The medium of claim 15, wherein the method reduces instances of vignette jumps.

20. The medium of claim 15, wherein the current dot gain linearization lookup table has fewer input points than a sum of input points for a set of historical dot gain linearization lookup tables used to generate the current dot gain linearization lookup table.

* * * * *